United States Patent
Muramatsu et al.

(10) Patent No.: US 9,116,547 B2
(45) Date of Patent: Aug. 25, 2015

(54) TRAFFIC INFORMATION PRESENTATION SYSTEM, TRAFFIC INFORMATION PRESENTATION METHOD, AND ELECTRONIC DEVICE

(71) Applicant: Panasonic Corporation, Osaka (JP)

(72) Inventors: Fumio Muramatsu, Kyoto (JP); Ryo Okumura, Osaka (JP); Yusuke Adachi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/250,859

(22) Filed: Apr. 11, 2014

(65) Prior Publication Data

US 2014/0320432 A1    Oct. 30, 2014

(30) Foreign Application Priority Data

Apr. 25, 2013  (JP) ................................. 2013-092359
Apr. 1, 2014   (JP) ................................. 2014-075084

(51) Int. Cl.
*G06F 3/044*   (2006.01)
*G06F 3/01*    (2006.01)
*G06F 3/041*   (2006.01)

(52) U.S. Cl.
CPC ................ *G06F 3/016* (2013.01); *G06F 3/041* (2013.01)

(58) Field of Classification Search
CPC ..... G06F 3/041; G06F 3/0416; G06F 3/0412; G06F 3/04883; G06F 3/0488; G06F 3/016; G06F 3/044; G06F 3/03545
See application file for complete search history.

(56) References Cited

U.S. PATENT DOCUMENTS

| | | | |
|---|---|---|---|
| 5,880,411 A | 3/1999 | Gillespie et al. | |
| 2003/0025597 A1* | 2/2003 | Schofield | 340/435 |
| 2005/0232469 A1* | 10/2005 | Schofield et al. | 382/104 |
| 2010/0164887 A1 | 7/2010 | Nakamura | |
| 2012/0030569 A1 | 2/2012 | Migos et al. | |
| 2012/0127098 A1 | 5/2012 | Lazaridis et al. | |
| 2014/0082094 A1* | 3/2014 | Bilgen et al. | 709/206 |

FOREIGN PATENT DOCUMENTS

JP    2005-335629 A    12/2005

* cited by examiner

*Primary Examiner* — Olga Merkoulova
(74) *Attorney, Agent, or Firm* — Renner, Otto, Boisselle & Sklar, LLP

(57) ABSTRACT

A traffic information presentation system according to an embodiment is a system for presenting a tactile sensation to a user based on traffic information, including: a touch section; a tactile presentation section; an input section for receiving traffic information; and a control section for controlling the tactile presentation section based on the traffic information. The control section monitors a status of touch with respect to the touch section, and accepts an instruction from the user that corresponds to the touch input operation when detecting that an amount of change in touched position equals to or exceeds a certain amount. When detecting that the amount of change in touched position is less than the certain amount and that the touch duration equals to or exceeds a certain length, the control section causes the tactile presentation section to present a tactile sensation based on the traffic information.

8 Claims, 10 Drawing Sheets

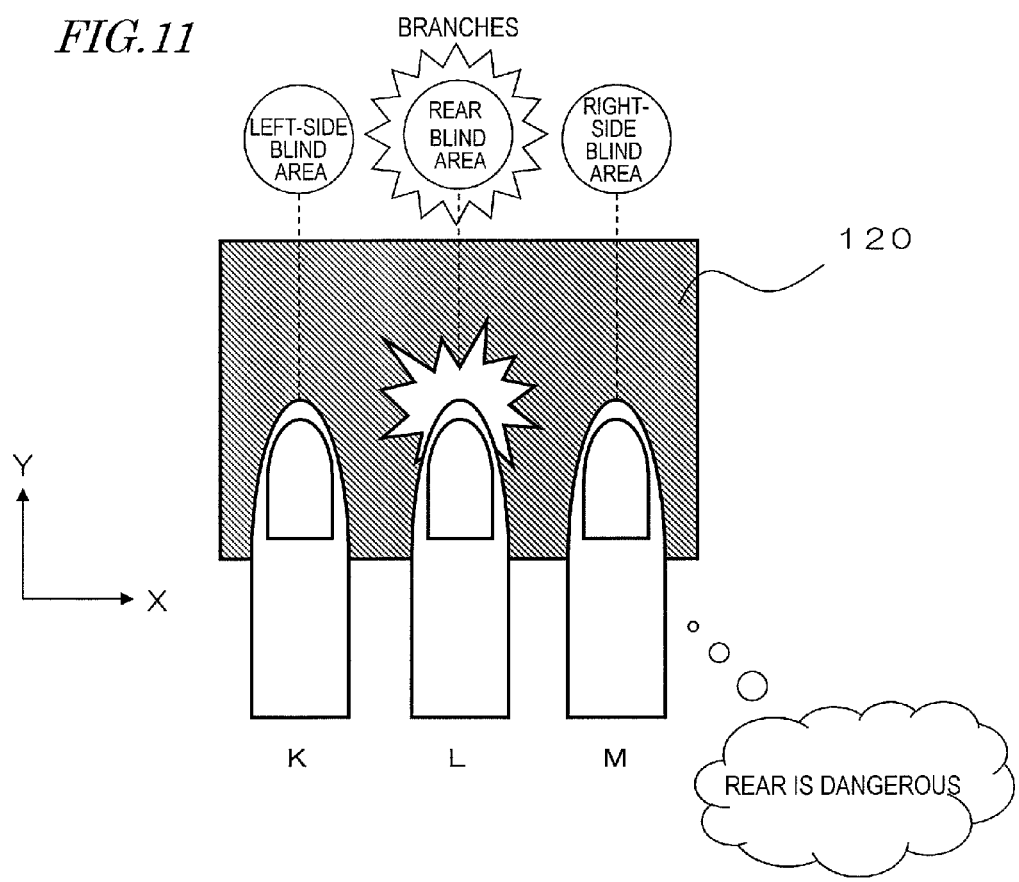

TRAFFIC INFORMATION PRESENTATION SYSTEM, TRAFFIC INFORMATION PRESENTATION METHOD, AND ELECTRONIC DEVICE

BACKGROUND

1. Technical Field

The present disclosure relates to a system, a method, and an electronic device for providing tactile sensations to a user.

2. Description of the Related Art

Japanese Laid-Open Patent Publication No. 2005-335629 discloses a control device for use in a vehicle, which presents a user in the vehicle with an appropriate vibration in accordance with the driving situation. This control device for use in a vehicle includes a control section which determines whether the user is concentrated on the driving of the vehicle based on the manner in which the vehicle is being driven. As a result, an appropriate vibration which is in accordance with the driving situation can be presented to the user in the vehicle.

The present disclosure provides a system, method, and electronic device for appropriately distinguishing whether the status of touch by a user is a state of awaiting information to be presented through tactile sensation or a state of performing a touch input operation.

SUMMARY

A traffic information presentation system according to an embodiment of the present disclosure is a traffic information presentation system for presenting a tactile sensation to a user based on traffic information, comprising: a touch section to be touched by the user; a tactile presentation section for presenting a tactile sensation to the user; an input section for receiving traffic information; and a control section for controlling the tactile presentation section based on the received traffic information, wherein, the control section monitors a status of touch with respect to the touch section, accepts an instruction from the user corresponding to a touch input operation when detecting that an amount of change in touched position equals to or exceeds a certain amount, and causes the tactile presentation section to present a tactile sensation based on the traffic information when detecting that the amount of change in touched position is less than the certain amount and that a touch duration equals to or exceeds a certain length.

An electronic device according to an embodiment of the present disclosure is an electronic device for use in a traffic information presentation system for presenting a tactile sensation to a user based on traffic information, comprising: a touch section to be touched by the user; a tactile presentation section for presenting a tactile sensation to the user; an input section for receiving traffic information; and a control section for controlling the tactile presentation section based on the received traffic information, wherein, the control section monitors a status of touch with respect to the touch section, accepts an instruction from the user corresponding to a touch input operation when detecting that an amount of change in touched position equals to or exceeds a certain amount, and causes the tactile presentation section to present a tactile sensation based on the traffic information when detecting that the amount of change in touched position is less than the certain amount and that a touch duration equals to or exceeds a certain length.

A method according to an embodiment of the present disclosure is a method of presenting a tactile sensation to a user based on traffic information, comprising the steps of: receiving traffic information; monitoring a status of touch with respect to a touch section to be touched by the user; accepting an instruction from the user corresponding to a touch input operation when detecting that an amount of change in touched position equals to or exceeds a certain amount; and presenting a tactile sensation based on the traffic information when detecting that the amount of change in touched position is less than the certain amount and that a touch duration equals to or exceeds a certain length.

A computer program according to an embodiment of the present disclosure is a computer program for causing an electronic device to execute a process of presenting a tactile sensation to a user based on traffic information, the computer program causing a computer in the electronic device to execute steps comprising: receiving traffic information; monitoring a status of touch with respect to a touch section to be touched by the user; accepting an instruction from the user corresponding to a touch input operation when detecting that an amount of change in touched position equals to or exceeds a certain amount; and presenting a tactile sensation based on the traffic information when detecting that the amount of change in touched position is less than the certain amount and that a touch duration equals to or exceeds a certain length.

According to one embodiment of the present disclosure, it is possible to appropriately distinguish whether a status of touch by a user is a state of awaiting information to be presented through tactile sensation or a state of performing a touch input operation.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 11 is a schematic illustration showing an exemplary tactile presentation according to an embodiment.

DETAILED DESCRIPTION

Hereinafter, with adequate reference to the drawings, embodiments will be described in detail. However, unnecessary details may be omitted from description. For example, matters that are well known may not be described in detail, and substantially identical component elements may not be redundantly described. This is to avoid lengthiness of the following description, and to facilitate understanding by those skilled in the art.

The attached drawings and the following description are provided by the inventors to allow those skilled in the art to sufficiently understand the present disclosure, without the intention of limiting the subject matter that is recited in the claims.

Embodiment 1

[1. Outline]

Figure 1:
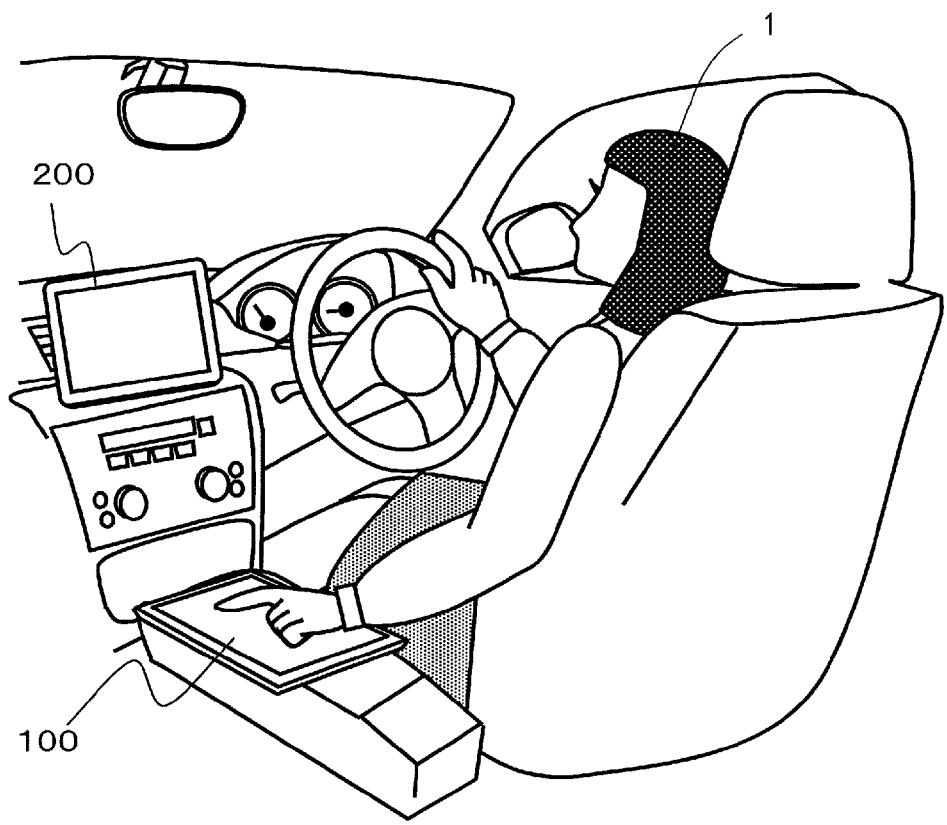
FIG. 1 is a schematic illustration showing the appearance of a touch input device according to an embodiment.

FIG. 1 is a schematic illustration showing the appearance of a touch input device 100 which is placed in an automobile. The touch input device 100 is an instance of an electronic device which presents tactile sensations to a user.

In this example, the touch input device 100 is placed at a so-called center console section, which is in between the driver's seat and the passenger seat.

By using the touch input device 100, the user 1 is able to operate an external onboard device, e.g., a car navigation system 200, a car audio system, or an air conditioner.

The car navigation system 200 is placed in the automobile. The touch input device 100 is connected to the car navigation system 200 so as to permit wired or wireless communications. The touch input device 100 accepts touch operations made with the fingers of the user 1. Thus, by using the touch input device 100, the user is able to operate the car navigation system 200 so as to provide navigation assistance to a destination.

Hereinafter, the touch input device 100 as such will be described in detail.

[2. Construction]

Figure 2:
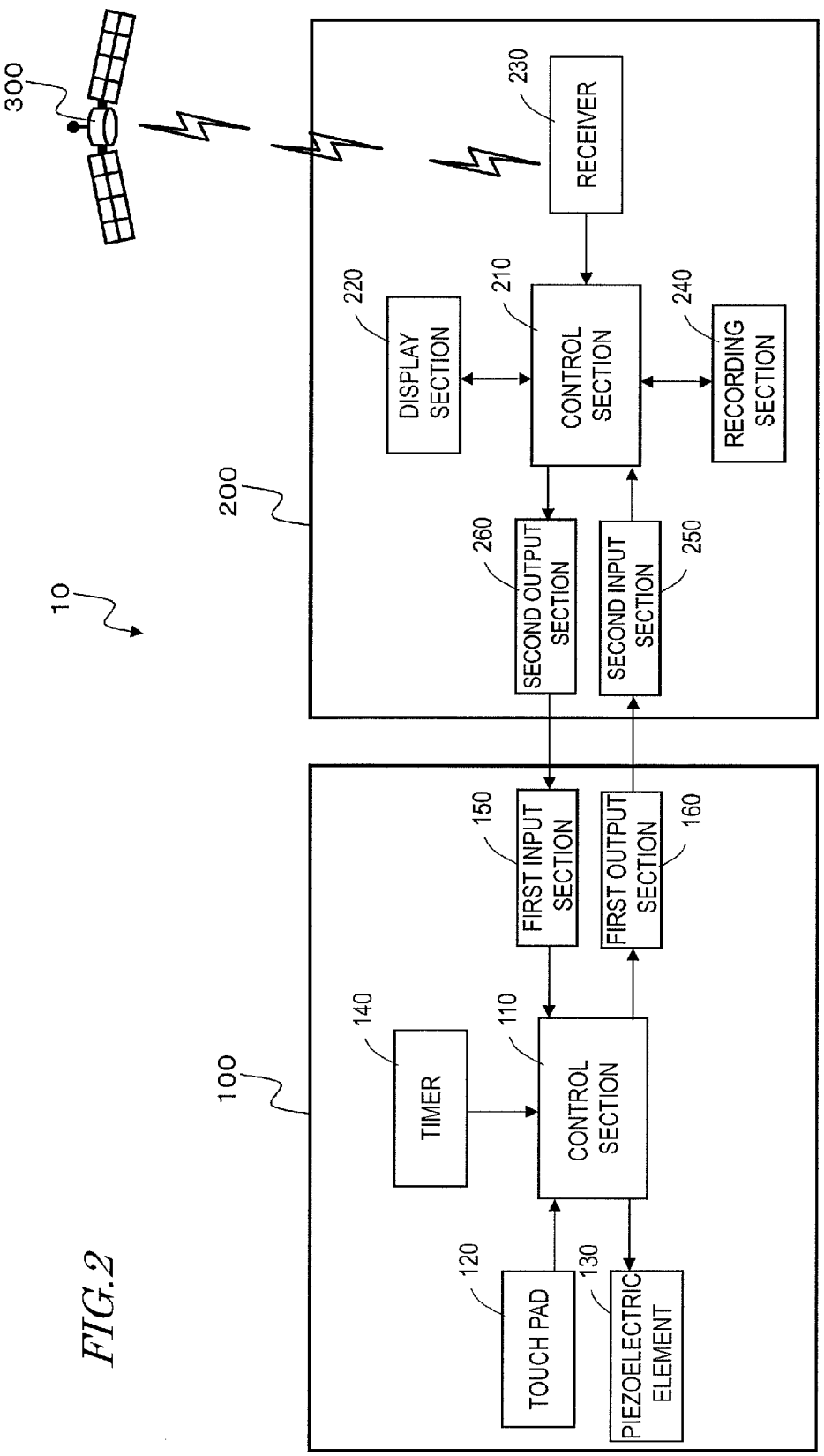
FIG. 2 is a schematic illustration showing the construction of a tactile presentation system according to an embodiment.
Figure 3:
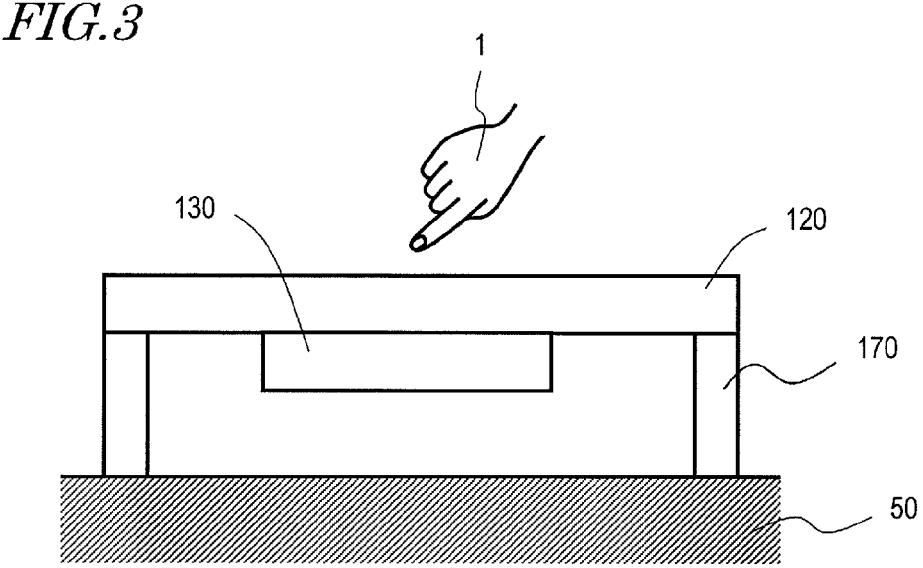
FIG. 3 is a cross-sectional view showing the schematic construction of a touch input device according to an embodiment.

FIG. 2 is a schematic illustration of the construction of a tactile presentation system 10 according to Embodiment 1. FIG. 3 is a cross-sectional view showing a schematic construction of the touch input device 100.

As shown in FIG. 2, the tactile presentation system 10 of the present embodiment includes the touch input device 100 and the car navigation system 200. Herein, as an example of the tactile presentation system 10, a traffic information presentation system which presents tactile sensation to a user based upon traffic information will be illustrated.

The touch input device 100 is an instance of an electronic device. The car navigation system 200 is an instance of an external device which is capable of communicating information with the touch input device 100 being connected thereto. By communicating with a GPS satellite 300, the car navigation system 200 is able to know the location of the automobile.

As shown in FIG. 2, the touch input device 100 includes a control section 110, a touch pad 120, a piezoelectric element 130, a timer 140, a first input section 150, and a first output section 160.

The touch pad 120 includes a sensor which detects contact on the touch pad 120 made by the user with a means of manipulation such as a finger or a touch pen, thus being able to detect coordinates of a point of contact on the touch pad 120. The sensor included in the touch pad 120 is a capacitance-type sensor, for example. Other than the capacitance-type, any known method, e.g., pressure-sensing, optical, or surface acoustic wave, may be adopted as the method of detecting user contact. Moreover, the touch pad 10 is capable of simultaneously detecting plural points of contact.

The touch pad 120 is controlled by the control section 110. Via the first output section 160, the control section 110 sends to the car navigation system 200 the information of a touch by the user as detected by the touch pad 120. The touch information which has been sent to the car navigation system 200 is sent to a control section 210 of the car navigation system 200 via a second input section 250. The control section 210 of the car navigation system 200 is able to execute various processes based on this touch information.

Based on the information concerning a touch operation received from the touch pad 120 or information other than touch operations, the control section 110 is able to vibrate the piezoelectric element 130. An example of information other than touch operations may be information that is received from the car navigation system 200. Via the touch pad 120, the user is able to feel a vibration which is adapted to the information from a touch operation or the car navigation system 200.

The traffic information for the control section 110 to receive from the car navigation system 200 may be, for example, information concerning the surrounding environment of the automobile during travel, information concerning lanes during travel, information concerning traffic congestion, information concerning road gradient, information concerning traffic regulations, and information concerning road width.

The timer 140 keeps point-of-time information. Based on the point-of-time information of the timer 140, the control section 110 measures an amount of time for which the user is touching the touch pad 120. The control section 110 controls the piezoelectric element 130 in accordance with the measured time, the details of which will be described later.

The first input section 150 and the first output section 160 are capable of communicating information with an external device being connected thereto. Specifically, the first input section 150 and the first output section 160 are connected wiredly (via cables) or wirelessly, etc. with the second input section 250 and the second output section 260 of the car navigation system 200 to provide a path for information exchange.

The car navigation system 200 includes: the control section 210; a display section 220 which displays a map image or an operation screen; a receiver 230 which is capable of communication with the GPS satellite 300; a recording section 240 in which map information, various programs, and the like are stored; the second input section 250; and the second output section 260.

The display section 220 displays a map together with the location of the automobile, buttons with which to operate the car navigation system 200, and so on.

Through communication with the GPS satellite 300, the receiver 230 transmits the location information of the automobile in which the car navigation system 200 is mounted to the control section 210 of the car navigation system.

The recording section 240 stores map information, various programs, and the like. In accordance with an instruction from the control section 210, the recording section 240 sends the map information and the like to the control section 210.

Based on the location information sent from the receiver 230 and the map information sent from the recording section 240, the control section 210 controls the display information to be displayed on the display section 220.

Moreover, the control section 210 can send traffic information such as map information and location information to the touch input device 100 via the second output section 260.

As shown in FIG. 3, the touch pad 120 is fixed to the vehicle body 50 via spacers 170. The touch pad 120, which is disposed in a place where it can be touched by the user 1, is composed of a material having a certain level of rigidity, e.g., resin, glass, metal, or a composite material thereof. The spacers 170 are composed of a material having a certain level of mechanical strength and elasticity, e.g., resin, metal, rubber, gel, or a composite material thereof, and thus has a rigidity for being able to support the touch pad 120.

The method of fixing the touch pad 120, the vehicle body 50, and the spacers 170 to one another may be fastening with screws, adhesive bonding with an adhesive, attachment via a double-coated adhesive tape, or other methods that provide a certain level of mechanical strength. Alternatively, the spacers 170, the touch pad 120, and the vehicle body 50 may be formed integrally.

Note that the touch pad 120 does not need to be placed between the driver's seat and the passenger seat. For example, the touch pad 120 may be placed on the dashboard, on the screen of the car navigation system 200, or on the steering wheel.

The piezoelectric element 130 is fixed on the rear face of the touch pad 120. For example, a plurality of piezoelectric elements 130 may be fixed on the rear face of the touch pad 120. The operation of the piezoelectric element 130 is controlled by the control section 110. The piezoelectric element 130 vibrates the touch pad 120 based on a driving signal which is sent from the control section 110, thereby presenting a tactile sensation to the user 1.

[3. Operation]

Next, the operation of the touch input device 100 will be described with reference to FIG. 4A to FIG. 6.

Figure 4A:
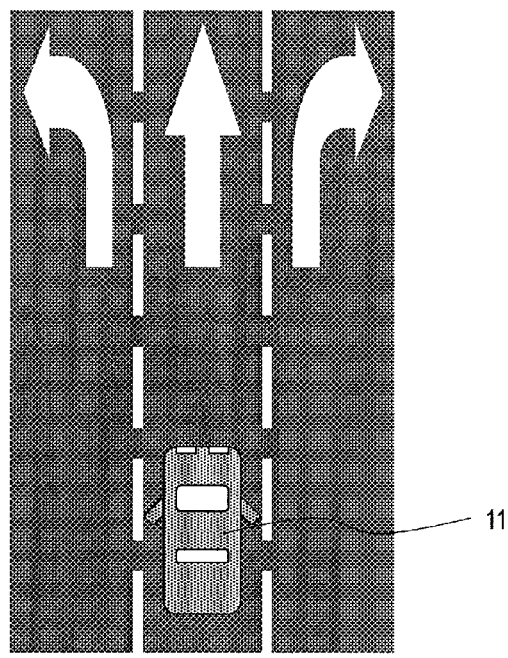
FIG. 4A is a schematic illustration showing a road situation during travel of an automobile according to an embodiment.
Figure 4B:
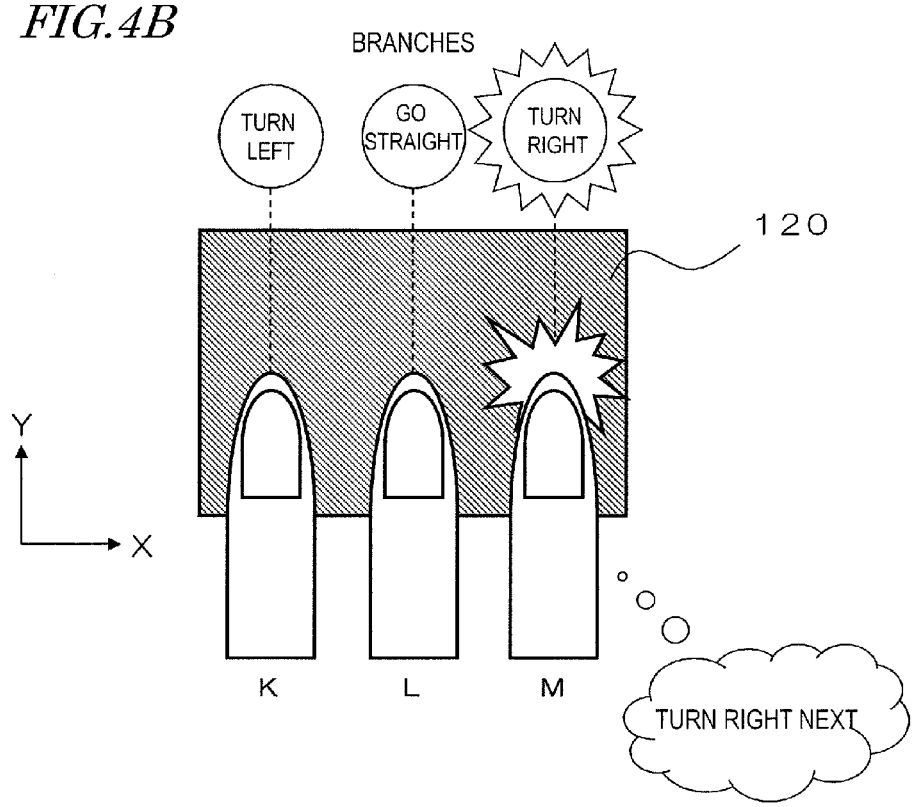
FIG. 4B is a schematic illustration showing an example method of presenting information to a user through tactile sensation according to an embodiment.

FIG. 4A and FIG. 4B are schematic illustrations of a specific exemplary operation of the touch input device 100 of the present embodiment. FIG. 4A shows a road situation during travel of the automobile 11. The automobile 11 is traveling along a road which has three lanes per direction: the left lane being a left-turn lane; the middle lane being a go-straight lane; and the right lane being a right-turn lane. The automobile 11 is now traveling in a go-straight lane.

FIG. 4B shows an example method of presenting information to the user through tactile sensation. When the user touches the touch pad 120 with three fingers, a finger K is mapped to the left-turn lane; a finger L is mapped to the go-straight lane; and a finger M is mapped to the right-turn lane, according to the X coordinate of the point of contact of each of these fingers.

Based on a destination which is designated by the user, the congestion information for the road, and so on, the car navigation system 200 determines a lane to recommend to the user. If the recommended lane is the right-turn lane, as shown in FIG. 4B, a tactile sensation is presented only to the finger M, which is associated with the right-turn lane. Since a tactile sensation is presented only to the finger M, the user knows that it is recommended to go in the right-turn lane. As the method of vibrating an arbitrary position on the touch pad 120, for example, a method of adjusting the vibration of the vibration source by taking into account the transfer function of vibration, a method of adjusting the positions of antinodes and nodes of vibration, or the like may be used.

Thus, by touching the touch pad 120, the user is able to receive a presentation of information which is sent from the car navigation system 200, through vibration of the touch pad 120. Although this example illustrates that the user touches the touch pad 120 with three fingers, the number of touching fingers may be greater than three, or two or less.

Figure 5:
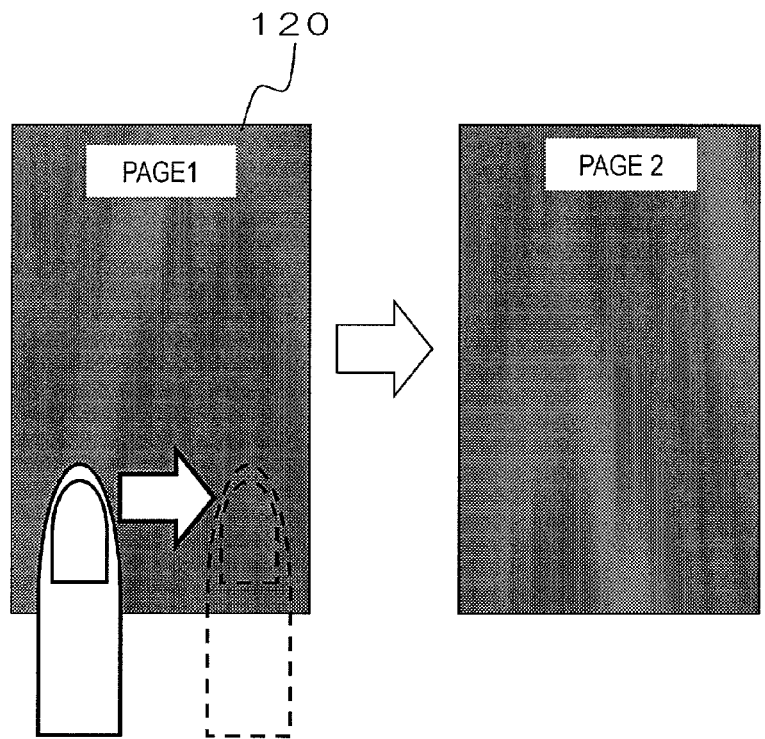
FIG. 5 is a schematic illustration of a user performing a flick according to an embodiment.
Figure 6:
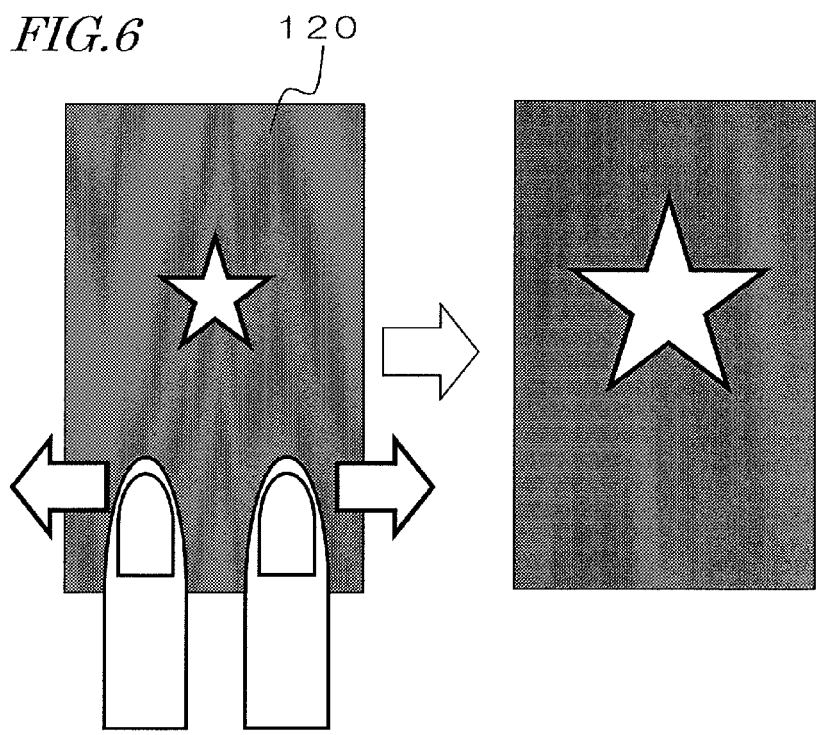
FIG. 6 is a schematic illustration of a user performing a pinch according to an embodiment.

FIG. 5 and FIG. 6 are schematic illustrations of exemplary touch input operations, i.e., operations by which the user sends instructions to the device.

FIG. 5 illustrates a user performing a flick. A flick is an operation in which the user moves a finger in one direction while the finger maintains contact with the touch pad 120. When the user moves a finger in one direction while the finger maintains contact with the touch pad 120, the displayed image is changed in accordance with the direction of movement. For example, a right move of the finger on the touch pads may cause a page-forward action, and a left move may cause a page-back action.

FIG. 6 illustrates a pinch being performed. A pinch is an operation where two fingers are moved closer together or apart from each other while the two fingers maintain contact with the touch pad. As the user moves the two fingers while keeping the two fingers in contact with the touch pad, the displayed image is changed in accordance with the operation. For example, if the two fingers are moved apart from each other, the image may be displayed with an increased magnification, and if the two fingers are moved closer together, the image may be displayed with a reduced magnification.

In order to facilitate understanding of a flick and a pinch, FIG. 5 and FIG. 6 illustrate a touch pad 120 having a display section. Although the touch pad 120 may thus have a display section, the touch pad 120 may actually lack a display section, in which case the image may be displayed on the display section 220 of the car navigation system 200.

Thus, the user can operate the car navigation system 200 by touching the touch pad 120.

Figure 7:
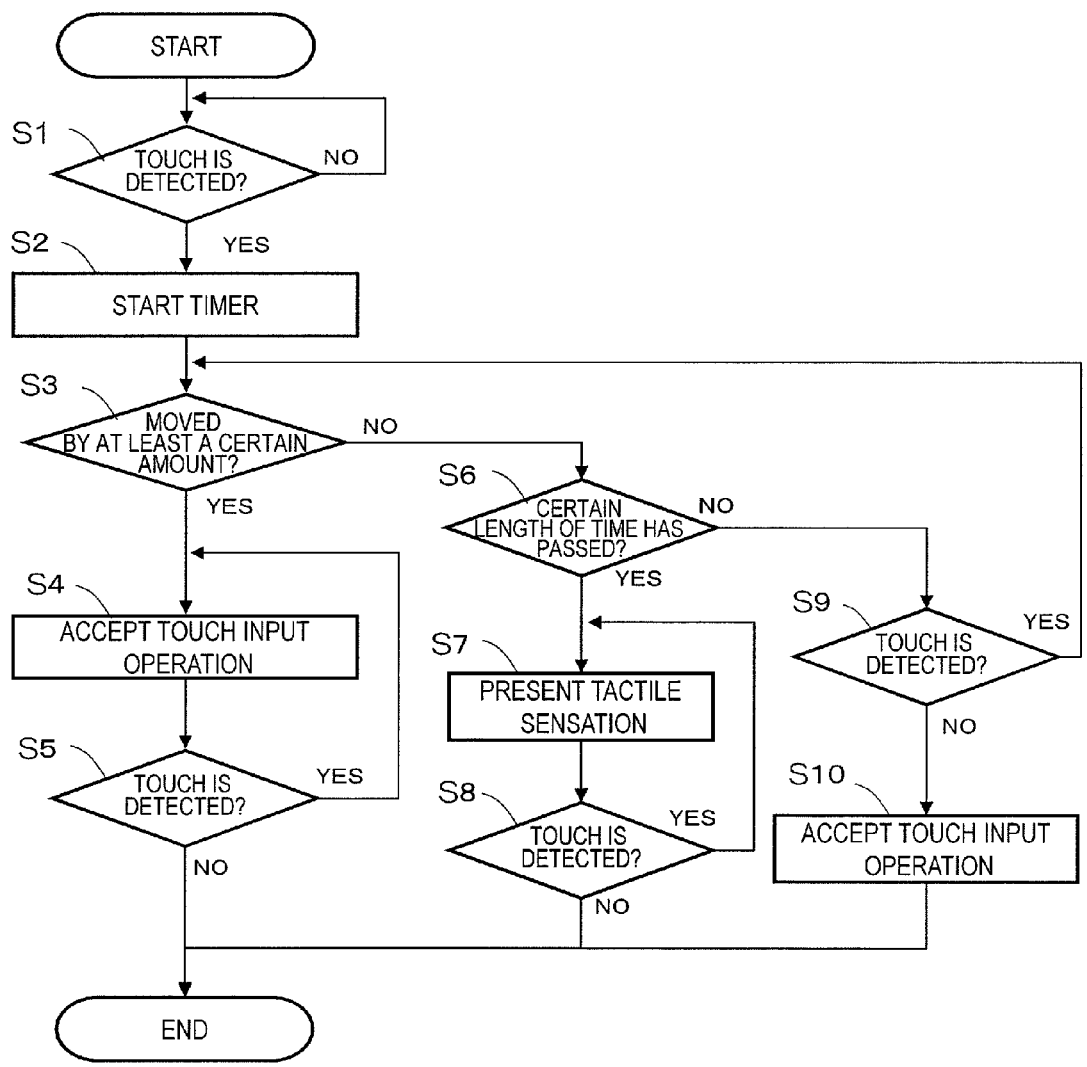
FIG. 7 is a flowchart showing processing by a touch input device according to an embodiment.

FIG. 7 is a flowchart showing processing by the touch input device 100.

The touch input device 100 is used in such a manner that the user keeps touching the touch pad 120 regardless of whether awaiting a presentation of information from the touch pad 120 through tactile sensation as shown in FIG. 4B (which may be referred to as a response operation) or performing a touch input operation as shown in FIG. 5 or FIG. 6. Therefore, it is necessary to appropriately distinguish whether the user's touch on the touch pad 120 constitutes a state of awaiting information to be presented through tactile sensation or a state of performing a touch input operation. By performing the processing shown in FIG. 7, the touch input device 100 of the present embodiment appropriately makes this distinction.

First, the control section 110 performs a touch detection as to whether the user is touching the touch pad 120 or not (step S1). If the user is touching the touch pad 120 (Yes from step S1), this contact information is sent to the control section 110. From the timer 140, the control section 110 receives point-of-time information concerning the point of time of detecting contact on the touch pad 120. Then, the control section 110 starts recording the touch duration (step S2). On the other hand, if contact on the touch pad 120 is not detected (No from step S1), the control section 110 keeps monitoring presence or absence of contact.

Next, the control section 110 determines whether the user's finger has moved on the touch pad by at least a certain amount or not (i.e., whether the amount of change in touched position has at least reached a certain amount or not) (step S3). If the user's finger has moved on the touch pad by at least the certain amount (Yes from step S3), the control section 110 determines that the user's operation is a touch input operation, and accepts an instruction from the user that corresponds to the touch input operation (step S4). For example, based on the user's instruction in the form of a flick or pinch as illustrated in FIG. 5 and FIG. 6, a process of changing the displayed content or the like is performed.

Thereafter, the control section 110 performs a touch detection as to whether the user is touching the touch pad 120 or not (step S5). If user contact is detected (Yes from step S5), the control section 110 determines that the touch input operation by the user is continuing, and accepts an instruction from the user that corresponds to the touch input operation (step S4). If user contact is not detected (No from step S5), the control section 110 determines that the touch input operation by the user is finished, and ends the process.

At step S3, if the user's finger has not moved on the touch pad 120 by at least the certain amount (No from step S3), the control section 110 determines whether the amount of time for which the user has maintained contact has exceeded a certain length (e.g. 0.5 seconds to 1 second) or not (step S6). If the amount of time for which the user has maintained contact has exceeded the certain length (Yes from step S6), the control section 110 determines that the user is awaiting a presentation of information from the touch pad 120 through tactile sensation. Then, the control section 110 drives the piezoelectric element 130 to present information which is in accordance with the user's request, through tactile sensation (vibration) (step S7). Thereafter, the control section 110 performs a touch detection as to whether the user is touching the touch pad 120 or not (step S8). If user contact is detected (Yes from step S8), the control section 110 determines that the user is still in a state of awaiting a tactile sensation to be presented, and thus presents a tactile sensation (step S7). If user contact is not detected (No from step S8), the control section 110 determines that the user is no longer in a state of awaiting a tactile sensation to be presented, and ends the process without performing a process of accepting an instruction from the user.

At step S6, if the amount of time for which the user has maintained contact is less than the certain length (No from step S6), the control section 110 performs a touch detection as to whether the user is touching the touch pad 120 or not (step S9). If user contact is detected (Yes from step S9), the control section 110 returns to the process of step S3 to determine whether the user's finger has moved by at least the certain amount or not (step S3). If user contact is not detected (No from step S9), the control section 110 determines that the user's operation is a tap operation, and accepts an instruction from the user that corresponds to the touch input operation (step S10), performs an operation based on the user's instruction, and ends the process.

By performing such processing, the touch input device 100 is able to appropriately distinguish whether the user's touch on the touch pad 120 constitutes a state of awaiting a tactile presentation or a state of performing a touch input operation. Therefore, through such processing, malfunctioning of the touch input device 100 is prevented. For example, while the user is touching the touch pad 120 to await a tactile presentation, the touch input device 100 is prevented from wrongly recognizing this contact as a touch input operation. Moreover, while the user is touching the touch pad 120 to perform a touch input operation, the touch input device 100 is prevented from presenting a tactile sensation.

Figure 8:
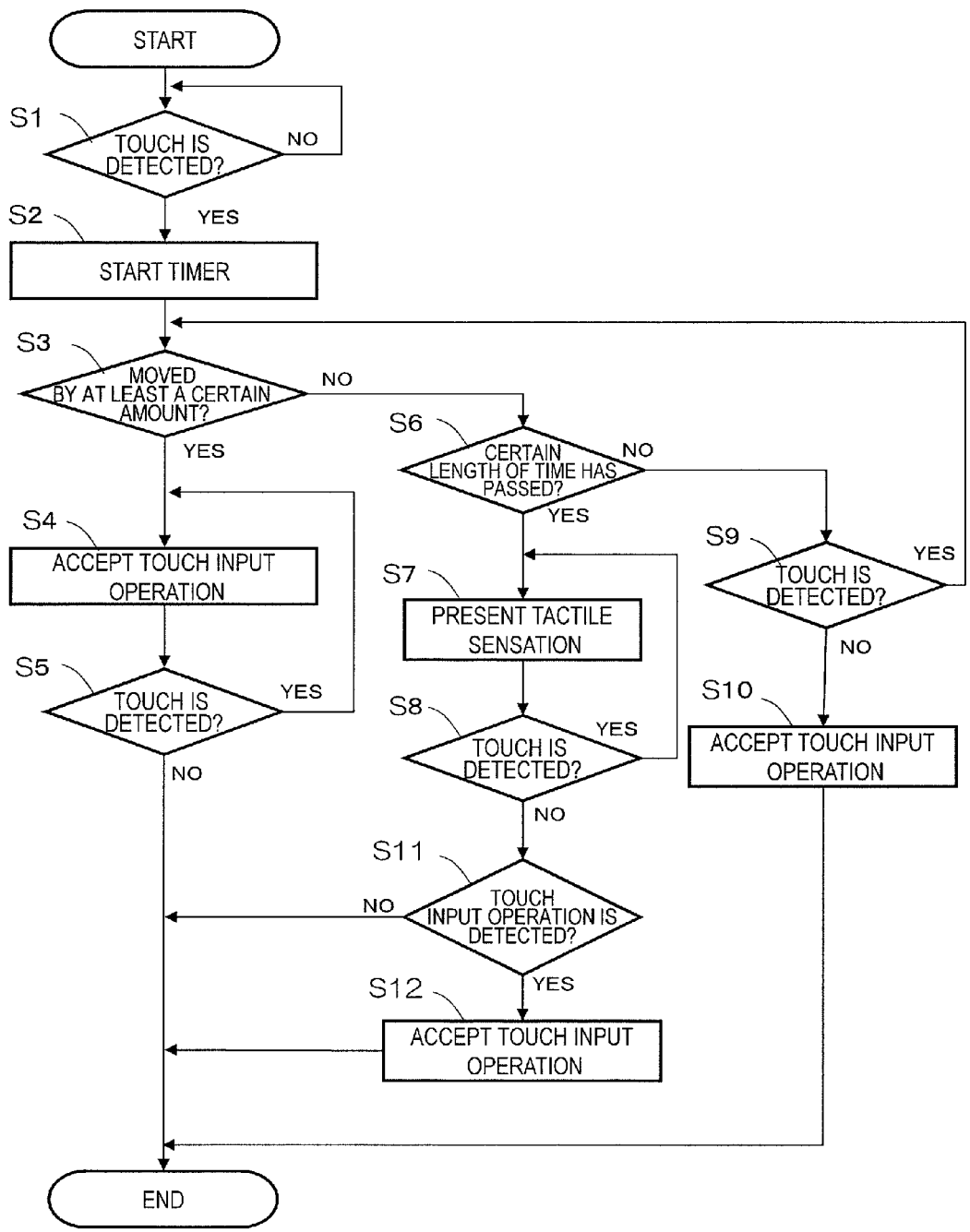
FIG. 8 is a flowchart showing processing by a touch input device according to an embodiment.

In the example shown in FIG. 7, the process is ended if user contact is not detected at step S8; however, if a touch input operation is made after a tactile sensation is presented, a process corresponding to the touch input operation may be executed. FIG. 8 is a flowchart showing an example of such processing. In FIG. 8, processes other than steps S8, S11, and S12 are identical to the processes shown in FIG. 7, and the descriptions thereof are omitted.

In the processing shown in FIG. 8, after user contact ceases to be detected at step S8, the control section 110 keeps monitoring the presence or absence of a touch input operation by the user for a certain length of time (step S11). As the method of touch input operation detection, for example, the method of touch input operation detection which has been described with reference to FIG. 7 may be performed.

If no touch input operation is detected (No from step S11), the process is ended. If a touch input operation is detected (Yes from step S11), an instruction from the user that corresponds to the touch input operation is accepted (step S12), and an operation based on the user's instruction is executed, whereby the process is ended. For example, after a tactile sensation is presented to the finger M being associated with the right-turn lane as shown in FIG. 4B, if the user performs a tap operation, the control section 110 may determine that the user has acknowledged a move into the right-turn lane, and cooperate with other devices in the automobile 11 to perform a process of activating blinkers for a change of lanes. If the automobile 11 is conducting autonomous driving, a process of moving the automobile 11 into the right-turn lane may be performed.

[4. Effects and the Like]

[4-1. Tactile Presentation Method]

Thus, the tactile presentation method according to the present embodiment is a method of presenting a tactile sensation based on received information to a user, in which the following processes are encompassed. Specifically, information other than information concerning a touch operation (e.g. traffic information) is received. A touch operation is monitored (step S1). If the amount of change in touched position is at least a certain amount (Yes from step S3), it is determined that the status of touch is a touch input operation, and a touch input operation is accepted (step S4). If the amount of change in the position touched by the user is less than the certain amount (No from step S3) and the touch duration is equal to or greater than a certain length (Yes from step S6), a tactile sensation based on the received information is presented (step S7).

Through such processing, it is possible to appropriately distinguish whether the user's touch on the touch pad 120 constitutes a state of awaiting a tactile presentation or a state of performing a touch input operation. This provides an improved usability for the user.

In this tactile presentation method, if the touch duration is less than the certain length (No from step S6 and S9), it is determined that the status of touch is a tap operation, and a touch input operation is accepted (step S10).

Such processing realizes an appropriate distinction which also takes a tap operation into consideration. This provides a further improved usability for the user.

In this tactile presentation method, after a tactile sensation is presented (step S7), if the touching state continues (Yes from step S8), a tactile sensation is again presented based on the received information (step S7).

Through these processes, while the user is touching the touch pad 120, a tactile sensation can keep being presented based on the received information. This allows the user to more accurately recognize the information.

In this tactile presentation method, received information may be, for example, traffic information which is transmitted from the car navigation system 200 (which is an instance of an external device). This allows the user to properly recognize the traffic information which is transmitted from the car navigation system 200.

[4-2. Tactile Presentation System]

The tactile presentation system 10 according to the present embodiment is a system for presenting a tactile sensation to the user, including the following construction. Specifically, the tactile presentation system 10 includes a touch pad 120 (which is an instance of a touch section), a piezoelectric element 130 (which is an instance of a tactile presentation section), and a control section 110.

The touch pad 120 accepts a touch operation by the user.

The piezoelectric element 130 presents a tactile sensation through vibration to the user.

The control section 110 receives information other than touch information (e.g. traffic information), and controls vibration of the piezoelectric element 130 based on the received information.

Then, the control section 110 performs the following process. Specifically, a touch operation is monitored (step S1). If the amount of change in touched position is at least a certain amount (Yes from step S3), it is determined that the status of touch is a touch input operation, and a touch input operation is accepted (step S4). If the amount of change in the position touched by the user is less than the certain amount (No from step S3) and the touch duration is equal to or greater than a certain length (Yes from step S6), a tactile sensation is presented based on the received information (step S7).

This makes it possible to appropriately distinguish whether the user's touch on the touch pad 120 constitutes a state of awaiting a tactile presentation or a state of performing a touch input operation. This provides an improved usability for the user.

If the touch duration is less than the certain length (No from step S6 and S9), the control section 110 determines that the status of touch is a tap input, and accepts a touch input operation (step S10).

This realizes an appropriate distinction which also takes a tap input into consideration, thus providing a further improved usability for the user.

Moreover, after a tactile sensation is presented (step S7), if the touching state continues (Yes from step S8), the tactile presentation system 10 again presents a tactile sensation based on the received information (step S7).

Thus, while the user is touching the touch pad 120, a tactile sensation can keep being presented based on the received information. This allows the user to more accurately recognize the information.

Moreover, the tactile presentation system 10 further includes a first input section 150 and a first output section 160 which are capable of communicating information with the car navigation system 200 (external device) being connected thereto. The first input section 150 receives information which is transmitted from the connected car navigation system 200, and sends this received information to the control section 110. Based on the information which has been sent from the first input section 150, the control section 110 controls vibration of the piezoelectric element 130. This allows the user to properly recognize the information which is transmitted from the car navigation system 200.

[4-3. Electronic Device]

The touch input device 100 (which is an instance of an electronic device) according to the present embodiment is a device for presenting a tactile sensation to the user, including the following construction. Specifically, the touch input device 100 includes a touch pad 120 (which is an instance of a touch section), a piezoelectric element 130 (which is an instance of a tactile presentation section), and a control section 110.

The touch pad 120 accepts a touch operation by the user.

The piezoelectric element 130 presents a tactile sensation through vibration to the user.

The control section 110 receives information other than touch information (e.g. traffic information), and controls vibration of the piezoelectric element 130 based on the received information.

Then, the control section 110 performs the following process. Specifically, a touch operation is monitored (step S1). If the amount of change in touched position is at least a certain amount (Yes from step S3), it is determined that the status of touch is a touch input operation, and a touch input operation is accepted (step S4). If the amount of change in the position touched by the user is less than the certain amount (No from step S3) and the touch duration is equal to or greater than a certain length (Yes from step S6), a tactile sensation is presented based on the received information (step S7).

This makes it possible to appropriately distinguish whether the user's touch on the touch pad 120 constitutes a state of awaiting a tactile presentation or a state of performing a touch input operation. This provides an improved usability for the user.

If the touch duration is less than the certain length (No from step S6 and S9), the control section 110 determines that the status of touch is a tap input, and accepts a touch input operation (step S10).

This realizes an appropriate distinction which also takes a tap input into consideration, thus providing a further improved usability for the user.

Moreover, after a tactile sensation is presented (step S7), if the touching state continues (Yes from step S8), the touch input device 100 again presents a tactile sensation based on the received information (step S7).

Thus, while the user is touching the touch pad 120, a tactile sensation can keep being presented based on the received information. This allows the user to more accurately recognize the information.

Moreover, the touch input device 100 further includes a first input section 150 and a first output section 160 which are capable of communicating information with the car navigation system 200 (external device) being connected thereto. The first input section 150 receives information which is transmitted from the connected car navigation system 200, and sends this received information to the control section 110. This allows the user to properly recognize the information which is transmitted from the car navigation system 200.

Embodiment 2

Next, with reference to FIG. 9, Embodiment 2 will be described. In Embodiment 1, the control section 110 of the touch input device 100 distinguishes between a state of awaiting a tactile presentation and a state of performing a touch input operation. Embodiment 2 differs from Embodiment 1 in that this process is performed by the control section of the car navigation system server. Hereinafter, members which are identical in function and construction to those of Embodiment 1 will be denoted by reference numerals similar to those used in Embodiment 1, and recurring descriptions may be omitted.

Figure 9:
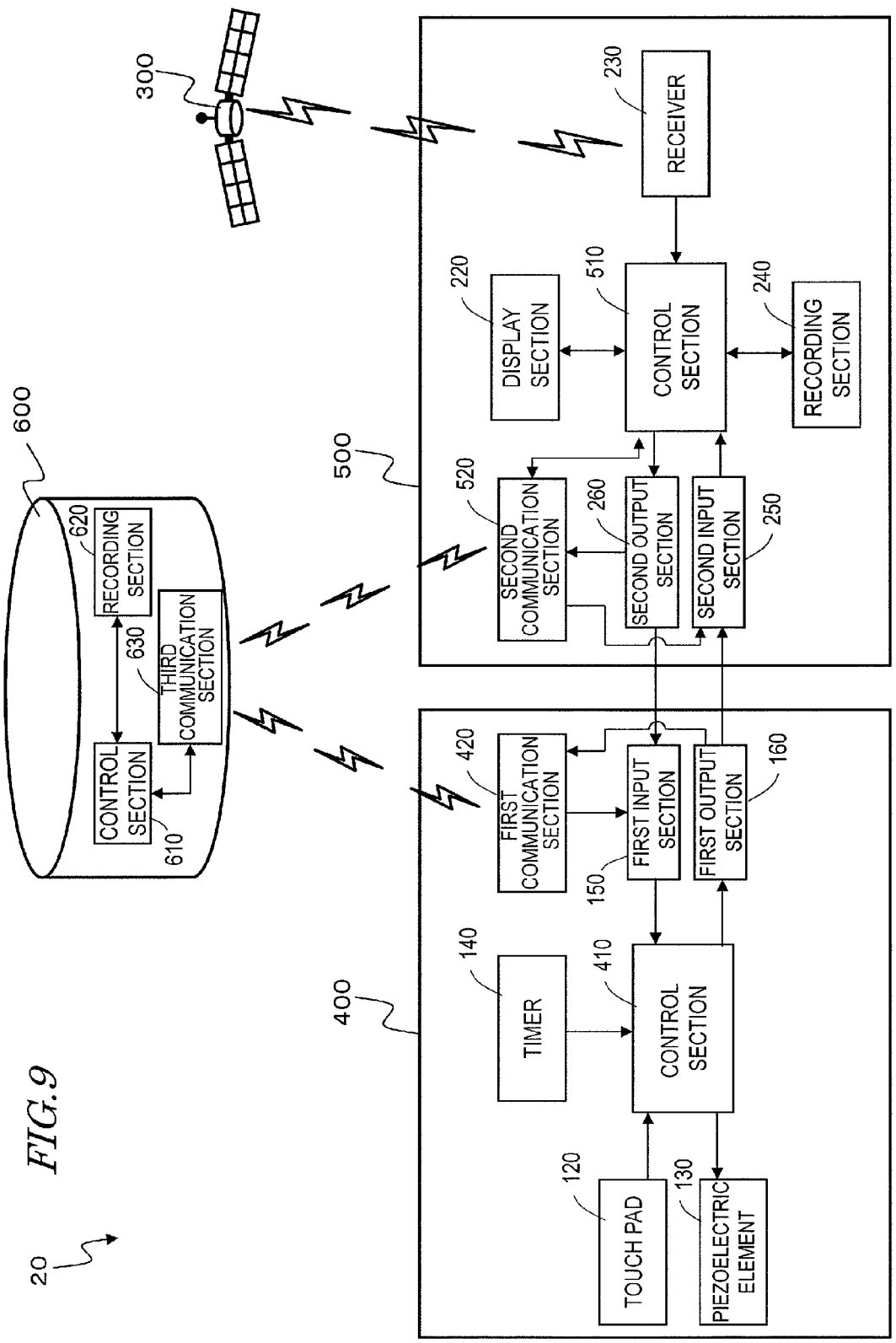
FIG. 9 is a schematic illustration showing the construction of a tactile presentation system according to an embodiment.

FIG. 9 is a schematic illustration showing the construction of a tactile presentation system 20 according to the present embodiment. As shown in FIG. 9, the tactile presentation system 20 includes a touch input device 400, a car navigation system 500, and a server 600. The touch input device 400 is capable of communicating information with the server 600 via wireless communications. The car navigation system 500 is capable of communicating information with the server 600 via wireless communications.

The touch input device 400 includes a touch pad 120, a piezoelectric element 130, a timer 140, a first input section 150, a first output section 160, a first communication section 420, and a control section 410 which controls them. The first communication section 420 is connected to a third communication section 630 of the server 600 via wireless communications. The control section 410 transmits information concerning a touch operation, which is detected by the touch pad 120, to the server 600 from the first communication section 420.

The car navigation system 500 includes a display section 220, a receiver 230, a recording section 240, a second input section 250, a second output section 260, a control section 510, and a second communication section 520. The second communication section 520 is connected to the third communication section 630 of the server 600 via wireless communications. The control section 510 transmits location information of the automobile from the second communication section 520 to the server 600.

The server 600 includes a control section 610, a recording section 620 in which various information and programs are stored, and the third communication section 630. The third communication section 630 receives information which is transmitted from the first communication section 420, and sends it to the control section 610. Moreover, the third communication section 630 receives information which is transmitted from the second communication section 520, and sends it to the control section 610.

In the present embodiment, the processing shown by the flowchart of FIG. 7 is performed by the control section 610. Then, based on an instruction from the control section 610, the control section 410 of the touch input device and the control section 510 of the car navigation system controls the operations of the respective component elements. For example, the control section 610 monitors the status of touch by the user with respect to the touch pad 120, and based on the result of monitoring, the control section 410 controls vibration of the piezoelectric element 130.

Thus, in accordance with the tactile presentation system 20 of the present embodiment, the processing which is performed by the control section 110 shown in FIG. 2 is allocated to a plurality of control sections. Note that the control section 610 of the server 600 may perform the further task of controlling vibration of the piezoelectric element 130. With such construction, the tactile presentation system 20 is able to appropriately determine whether the status of touch by the user is a state of awaiting a tactile presentation or a state of performing a touch input operation.

Embodiment 3

Hereinafter, with reference to FIG. 10, Embodiment 3 will be described. In Embodiments 1 and 2, a tactile sensation is presented based on information which is transmitted from a car navigation system. Embodiment 3 differs from Embodiments 1 and 2 in that a tactile sensation is presented based on information which is transmitted from an onboard camera system 700. Hereinafter, members which are identical in function and construction to those of Embodiments 1 and 2 will be denoted by reference numerals similar to those used in Embodiment 1, and recurring descriptions may be omitted.

Figure 10:
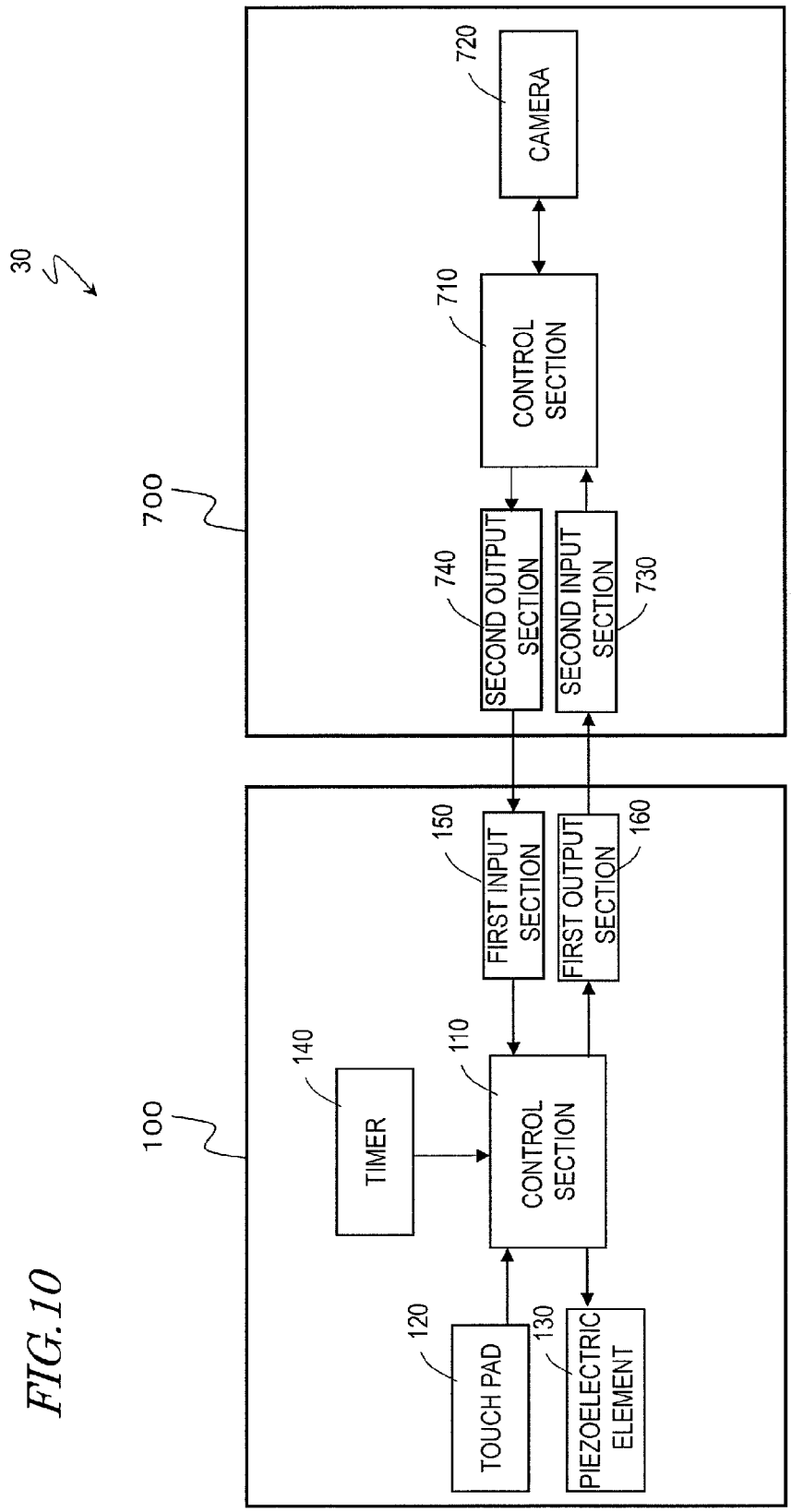
FIG. 10 is a schematic illustration showing the construction of a tactile presentation system according to an embodiment.

FIG. 10 is a schematic illustration showing the construction of a tactile presentation system 30. As shown in FIG. 10, the tactile presentation system 30 includes a touch input device 100 and the onboard camera system 700. The touch input device 100 is identical in construction to that of Embodiment 1, and the description thereof is omitted.

The onboard camera system 700 is a system which images the exterior of the automobile. The onboard camera system 700 includes an onboard camera control section 710, cameras 720, a second input section 730, and a second output section 740.

The plurality of cameras 720 are provided at positions where they can image the surroundings of the automobile. The cameras 720 may be disposed at, for example: a place at which blind areas on the left side of the automobile can be imaged, a place at which blind areas on the right side of the automobile can be imaged, a place at which blind areas at the rear of the automobile can be imaged, and so on. The places to dispose the cameras 720 may be arbitrary so long as these places form blind areas for the user.

The image information which is taken by each camera 720 is sent to the onboard camera control section 710. Based on the image information which is taken with each camera 720, the onboard camera control section 710 determines whether a person or an object exists at any position which forms a blind area for the automobile. For example, if a person appears on the camera 720 for imaging the blind areas at the rear while no person or object appears on the camera 720 for imaging the blind areas on the left side or on the camera 720 for imaging the blind areas on the right side, then the onboard camera control section 710 sends the information that "the right and left are safe, but the rear is dangerous" to the touch input device 100. The touch input device 100 presents a tactile sensation based on this information.

FIG. 11 is a schematic illustration showing an exemplary tactile presentation according to Embodiment 3. As shown in FIG. 11, when the user touches the touch pad 120 with three fingers, a finger K is mapped to the left blind areas; a finger L is mapped to the rear blind areas; and a finger M is mapped to the right blind areas, according to the X coordinates of the point of contact of each finger. Then, as shown in FIG. 11, a tactile sensation is presented only to the finger L, which is associated with the rear blind areas. Since the tactile sensation is presented only to the finger L, the user recognizes that the rear of the automobile is dangerous.

Similarly to Embodiment 1, the touch input device 100 of the present embodiment can perform the processing shown in FIG. 7. Therefore, the touch input device 100 is able to appropriately determine whether the status of touch by the user is a state of awaiting a tactile presentation or a state of performing a touch input operation. Moreover, the tactile presentation system 30 of the present embodiment is able to appropriately determine whether the status of touch by the user is a state of awaiting a tactile presentation or a state of performing a touch input operation.

Other Embodiments

Thus, Embodiments 1 to 3 have been illustrated as examples of the technique disclosed in the present application. However, without being limited thereto, the technique of the present disclosure is applicable also to embodiments resulting through any appropriate change, substitution, addition, omission, and the like. Moreover, the component elements described in Embodiments 1 to 3 above may be combined to create new embodiments.

Now, then, other embodiments will be illustrated.

In Embodiments 1 and 2, "information other than information concerning a touch operation" is exemplified by information concerning road lanes and road traffic congestion. In Embodiment 3, "information other than information concerning a touch operation" is exemplified by information of an image which is taken with an onboard camera. However, "information other than information concerning a touch operation" is not limited thereto. For example, in the case where a touch input device is used for a car navigation system, "information other than information concerning a touch operation" may be: information concerning the remaining amount of gasoline in the automobile, temperature in the automobile, wear of the tire, or the like; or setting information that is designated by the user for the car navigation system 6, e.g., "expressways first" or "local roads first".

Although Embodiment 1 illustrates an example construction in which the touch input device 100 is connected to the car navigation system 200, but this not a limitation. For example, a construction in which the touch input device 100 is included in the car navigation system 200 may be adopted. Moreover, the touch input device 100 may be connected to or included in any device other than a car navigation system. In the case where the touch input device 100 is included in a smartphone, "information other than information concerning a touch operation" may be information concerning the remaining amount of the battery or received intensity of radiowaves, the orientation and tilt of the smartphone, or the remaining capacity of the memory or HDD. In the case where the touch input device 100 is included in a compact camera or a camera with interchangeable lenses, "information other than information concerning a touch operation" may be lens-related information, e.g., the angle of view or F number, or information such as the subject position. In the case where the touch input device 100 is connected to a portable navigation system, "information other than information concerning a touch operation" may be information concerning the presence or absence of a stairway or steps, an escalator, or the like.

Although the above embodiments illustrate that a tactile sensation is presented by generating vibration, the technique of the present disclosure is not limited thereto. For example, a tactile sensation may be presented through a combination of vibration with other methods such as electrostatic-based changes in friction, skin stimulation with an electric current, or changes in screen shape introduced by a liquid. Moreover, not only a tactile sensation but also image-displaying, sound, light, heat, or the like may be combine as appropriate.

Note that the control operations according to embodiments of the present disclosure may be implemented in hardware or software. A computer program for executing such control operations may be stored in an internal memory of a microcomputer or in a storage medium which is separately provided in addition to a microcomputer. Alternatively, the control section may store such a computer program. Moreover, such a computer program may be installed to the electronic device from a storage medium (an optical disk, a semiconductor memory, etc.) in which it is stored, or downloaded via telecommunication lines such as the Internet.

Although the above embodiments illustrate that contact with the user's finger(s) is detected, the technique of the present disclosure is not limited thereto. For example, contact with a touch pen may be detected.

Moreover, the touch pad 10 may be transparent, and a display may be provided on the rear face of the touch pad 10; that is, the touch pad 10 may be a transparent touch panel. The touch pad 120 may not have a planar shape; for example, the touch pad 120 may have a curved surface, or a spherical surface. Moreover, the touch pad 10 may be composed of a plurality of sheets.

Summary

As described above, a traffic information presentation system according to an embodiment of the present disclosure is a traffic information presentation system 10 for presenting a tactile sensation to a user based on traffic information, comprising: a touch section 120 to be touched by the user; a tactile presentation section 130 for presenting a tactile sensation to the user; an input section 150 for receiving traffic information; and a control section 110 for controlling the tactile presentation section 130 based on the received traffic information, wherein, the control section 110 monitors a status of touch with respect to the touch section 120, accepts an instruction from the user corresponding to a touch input operation when detecting that an amount of change in touched position equals to or exceeds a certain amount, and causes the tactile presentation section 130 to present a tactile sensation based on the traffic information when detecting that the amount of change in touched position is less than the certain amount and that a touch duration equals to or exceeds a certain length.

For example, when the touch duration is less than the certain length, the control section 110 may accept an instruction from the user corresponding to a touch input operation.

For example, when detecting that the touch on the touch section 120 still continues after a tactile sensation is presented, the control section 110 may cause the tactile presentation section 130 to again present a tactile sensation based on the traffic information.

For example, when detecting a touch input operation after a tactile sensation is presented, the control section 110 may accept an instruction from the user corresponding to a touch input operation.

For example, the input section 150 may receive the traffic information from an external device.

For example, as the control section, the traffic information presentation system 20 may include a first control section 410 being provided in a first device 400 and a second control section 610 being provided in a second device 600 other than the first device 400, wherein the first device 400 includes the touch section 120 and the tactile presentation section 130; the first device 400 and the second device 600 perform wireless communications; the second control section 610 monitors a status of touch with respect to the touch section 120; and the first control section 410 controls the tactile presentation section 130 based on a result of monitoring by the second control section 610.

An electronic device according to an embodiment of the present disclosure is an electronic device 100 for use in a traffic information presentation system 10 for presenting a tactile sensation to a user based on traffic information, comprising: a touch section 120 to be touched by the user; a tactile presentation section 130 for presenting a tactile sensation to the user; an input section 150 for receiving traffic information; and a control section 110 for controlling the tactile presentation section 130 based on the received traffic information, wherein, the control section 110 monitors a status of touch with respect to the touch section 120, accepts an instruction from the user corresponding to a touch input operation when detecting that an amount of change in touched position equals to or exceeds a certain amount, and causes the tactile presentation section 130 to present a tactile sensation based on the traffic information when detecting that the amount of change in touched position is less than the certain amount and that a touch duration equals to or exceeds a certain length.

A method according to an embodiment of the present disclosure is a method of presenting a tactile sensation to a user based on traffic information, comprising the steps of: receiving traffic information; monitoring a status of touch with respect to a touch section 120 to be touched by the user;

accepting an instruction from the user corresponding to a touch input operation when detecting that an amount of change in touched position equals to or exceeds a certain amount; and presenting a tactile sensation based on the traffic information when detecting that the amount of change in touched position is less than the certain amount and that a touch duration equals to or exceeds a certain length.

A computer program according to an embodiment of the present disclosure is a computer program for causing an electronic device 100 to execute a process of presenting a tactile sensation to a user based on traffic information, the computer program causing a computer in the electronic device 100 to execute steps comprising: receiving traffic information; monitoring a status of touch with respect to a touch section 120 to be touched by the user; accepting an instruction from the user corresponding to a touch input operation when detecting that an amount of change in touched position equals to or exceeds a certain amount; and presenting a tactile sensation based on the traffic information when detecting that the amount of change in touched position is less than the certain amount and that a touch duration equals to or exceeds a certain length.

The technique of the present disclosure is applicable to electronic devices which are capable of presenting a tactile sensation to a user. For example, the technique of the present disclosure is applicable to a car navigation system, a digital still camera, a camcorder, a mobile phone with a camera function, a smartphone, a tablet PC, or the like.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

This application is based on Japanese Patent Applications No. 2013-092359 filed on Apr. 25, 2013 and No. 2014-075084 filed on Apr. 1, 2014, the entire contents of which are hereby incorporated by reference.

What is claimed is:

1. A traffic information presentation system for presenting a tactile sensation to a user based on traffic information, comprising:
   a touch section to be touched by the user;
   a tactile presentation section for presenting a tactile sensation to the user;
   an input section for receiving traffic information; and
   a control section for controlling the tactile presentation section based on the received traffic information,
   wherein,
   the control section
      monitors a status of touch with respect to the touch section,
      accepts an instruction from the user corresponding to a touch input operation when detecting that an amount of change in touched position equals to or exceeds a certain amount, and
      causes the tactile presentation section to present a tactile sensation based on the traffic information when detecting that the amount of change in touched position is less than the certain amount and that a touch duration equals to or exceeds a certain length.

2. The traffic information presentation system of claim 1, wherein, when the touch duration is less than the certain length, the control section accepts an instruction from the user corresponding to a touch input operation.

3. The traffic information presentation system of claim 1, wherein, when detecting that the touch on the touch section still continues after a tactile sensation is presented, the control section causes the tactile presentation section to again present a tactile sensation based on the traffic information.

4. The traffic information presentation system of claim 1, wherein, when detecting a touch input operation after a tactile sensation is presented, the control section accepts an instruction from the user corresponding to a touch input operation.

5. The traffic information presentation system of claim 1, wherein the input section receives the traffic information from an external device.

6. The traffic information presentation system of claim 1, wherein,
   as the control section, the traffic information presentation system includes a first control section being provided in a first device and a second control section being provided in a second device other than the first device, wherein the first device includes the touch section and the tactile presentation section;
   the first device and the second device perform wireless communications;
   the second control section monitors a status of touch with respect to the touch section; and
   the first control section controls the tactile presentation section based on a result of monitoring by the second control section.

7. An electronic device for use in a traffic information presentation system for presenting a tactile sensation to a user based on traffic information, comprising:
   a touch section to be touched by the user;
   a tactile presentation section for presenting a tactile sensation to the user;
   an input section for receiving traffic information; and
   a control section for controlling the tactile presentation section based on the received traffic information,
   wherein,
   the control section
      monitors a status of touch with respect to the touch section,
      accepts an instruction from the user corresponding to a touch input operation when detecting that an amount of change in touched position equals to or exceeds a certain amount, and
      causes the tactile presentation section to present a tactile sensation based on the traffic information when detecting that the amount of change in touched position is less than the certain amount and that a touch duration equals to or exceeds a certain length.

8. A method of presenting a tactile sensation to a user based on traffic information, comprising the steps of:
   receiving traffic information;
   monitoring a status of touch with respect to a touch section to be touched by the user;
   accepting an instruction from the user corresponding to a touch input operation when detecting that an amount of change in touched position equals to or exceeds a certain amount; and presenting a tactile sensation based on the traffic information when detecting that the amount of change in touched position is less than the certain amount and that a touch duration equals to or exceeds a certain length.

* * * * *